United States Patent [19]

Bethea et al.

[11] Patent Number: 4,708,615
[45] Date of Patent: Nov. 24, 1987

[54] LOW PRESSURE DROP, MODULAR COEXTRUSION FEEDBLOCK

[75] Inventors: James R. Bethea, Denham Springs; Clifton T. Knight, Baton Rouge, both of La.

[73] Assignee: The Dow Chemical Company, Midland, Mich.

[21] Appl. No.: 924,705

[22] Filed: Oct. 29, 1986

[51] Int. Cl.$^4$ .............................................. B29C 47/12
[52] U.S. Cl. ................................ 425/131.1; 264/171; 425/133.5; 425/192 R; 425/462
[58] Field of Search ............... 425/129 R, 130, 131.1, 425/133.1, 133.5, 182, 190, 191, 192 R, 376 R, 380, 382 R, 461, 462, 466, 467; 264/171

[56] References Cited

U.S. PATENT DOCUMENTS

| | | | |
|---|---|---|---|
| 3,032,008 | 5/1962 | Land et al. | 425/382 R |
| 3,485,912 | 12/1969 | Schrenk et al. | 264/171 |
| 3,524,795 | 8/1970 | Peterson | 264/171 |
| 3,557,265 | 1/1971 | Chisholm et al. | 264/47 |
| 3,559,239 | 2/1971 | Work et al. | 264/171 |
| 3,565,985 | 2/1971 | Schrenk et al. | 264/171 |
| 3,825,644 | 7/1974 | Hoagland et al. | 264/171 |
| 3,833,704 | 9/1974 | Nissel | 264/171 |
| 3,918,865 | 11/1975 | Nissel | 425/131.1 |
| 3,924,990 | 12/1975 | Schrenk | 425/131.1 |
| 3,959,431 | 5/1976 | Nissel | 264/171 |
| 4,144,011 | 3/1979 | Sponaugle | 425/133.5 |
| 4,152,387 | 5/1979 | Cloeren | 264/171 |
| 4,323,339 | 4/1982 | de Kok et al. | 425/467 |
| 4,336,012 | 6/1982 | Koch et al. | 425/131.1 |
| 4,365,949 | 12/1982 | Nash | 425/467 |
| 4,402,898 | 9/1983 | Rosenbaum | 425/467 |
| 4,504,210 | 3/1985 | Titz et al. | 425/467 |
| 4,600,550 | 7/1986 | Cloren | 264/171 |

FOREIGN PATENT DOCUMENTS 0168926 5/1985 European Pat. Off.

Primary Examiner—Jay H. Woo
Assistant Examiner—J. Fortenberry
Attorney, Agent, or Firm—D. R. Howard

[57] ABSTRACT

A modular coextrusion feedblock suitable for use in conjunction with melt processing vinyl polymers without excessive extruder head pressure is provided. The feedblock is designed for rapid disassembly and reassembly to minimize downtime.

10 Claims, 18 Drawing Figures

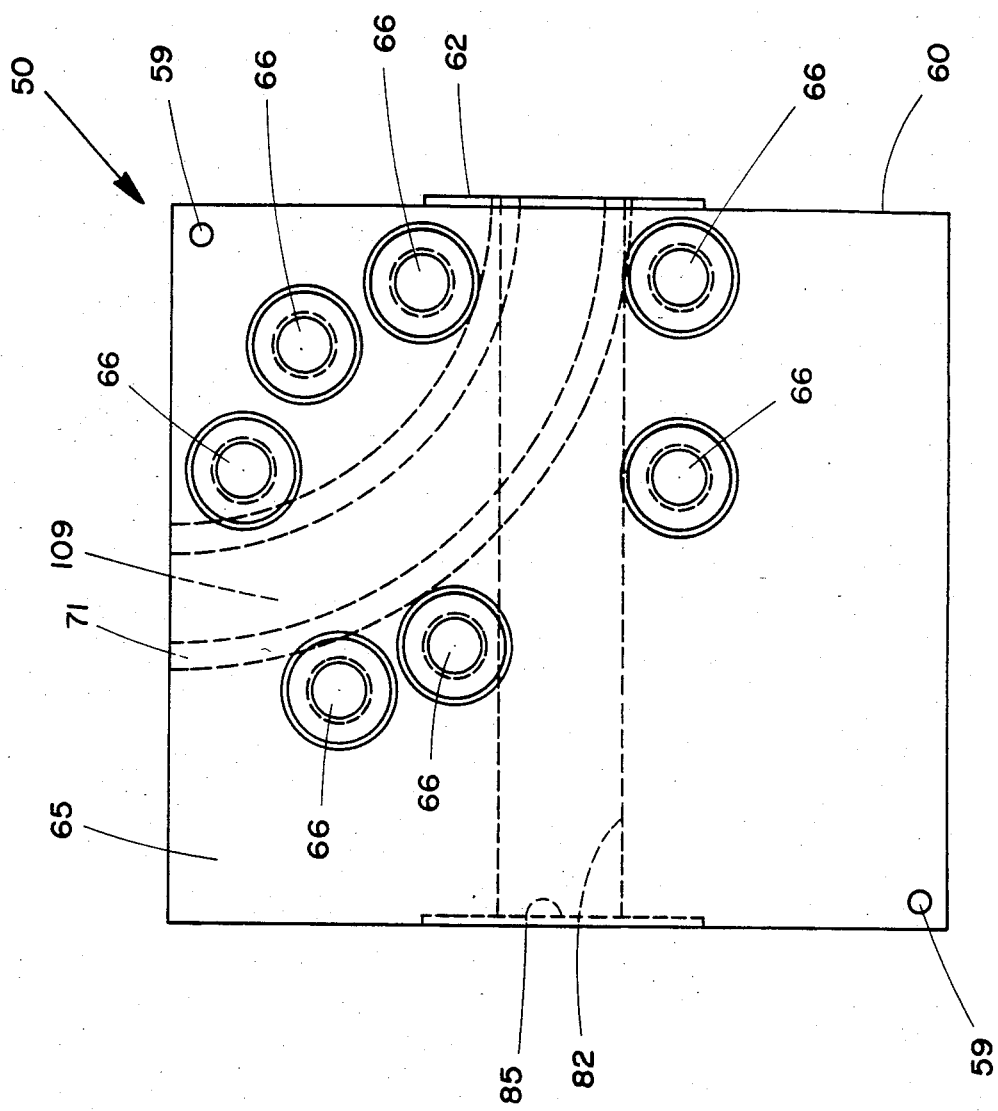

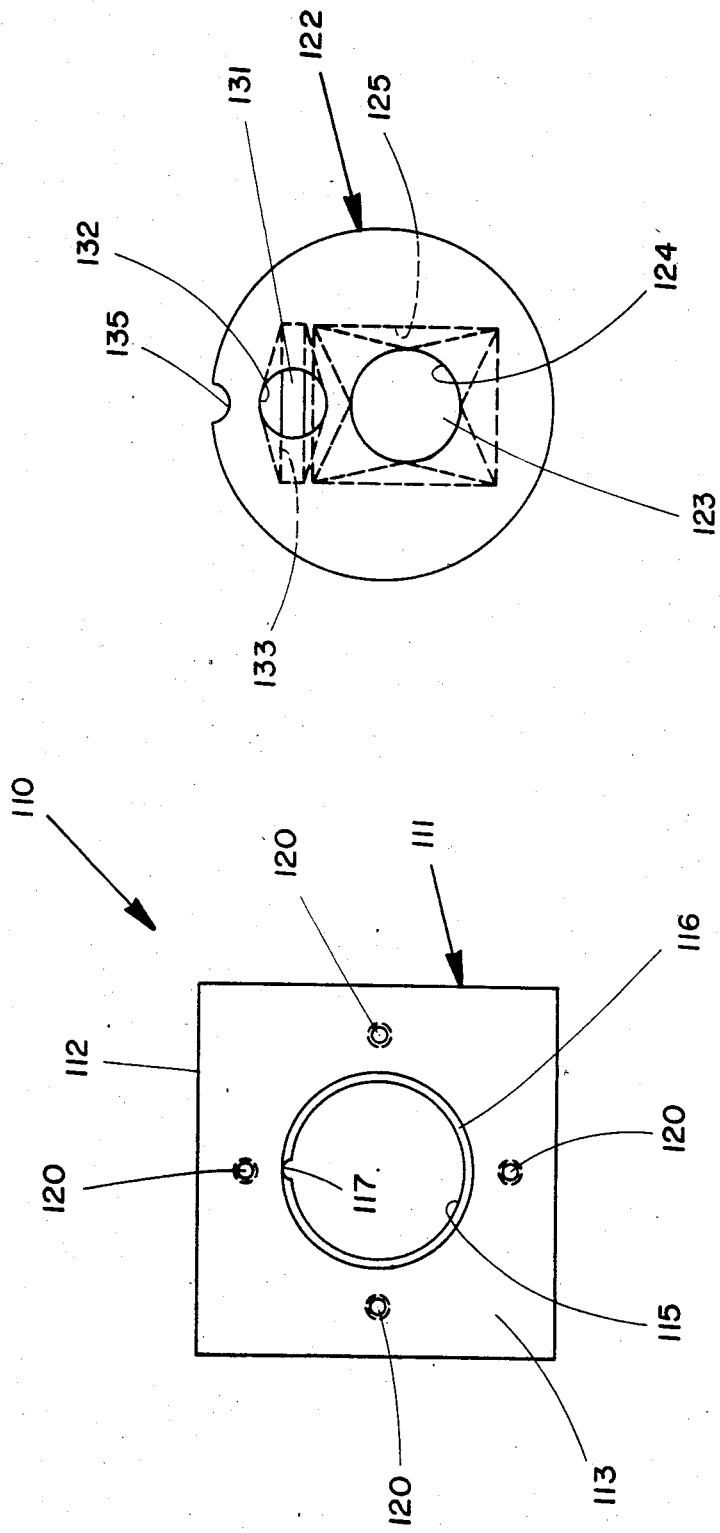

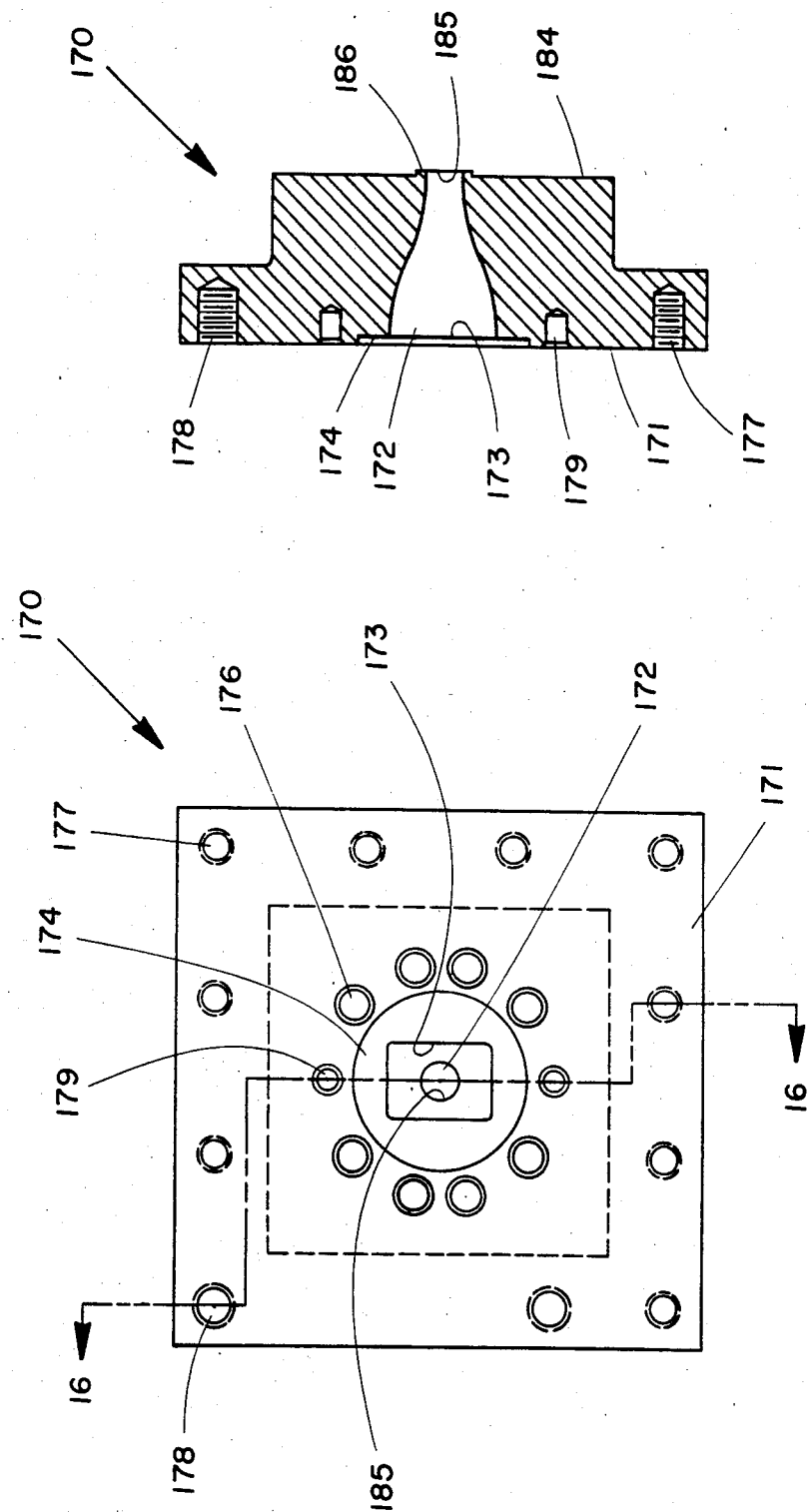

LOW PRESSURE DROP, MODULAR COEXTRUSION FEEDBLOCK

BACKGROUND OF THE INVENTION

This invention generally concerns an apparatus suitable for use in melt processing and coextruding a variety of polymer resins. This invention particularly concerns a coextrusion feedblock suitable for use in conjunction with melt processing rigid vinyl chloride polymer resins. This invention more particularly concerns a modular coextrusion feedblock which, in conjunction with a conventional die, provides a maximum extruder head pressure of about 5000 pounds per square inch (psi) (34.5 megapascals (MPa)).

Coextrusion of sheet or film permits preparation of a wide variety of laminates by the simultaneous extrusion of two or more diverse thermoplastic materials. Many of these laminates contain several layers. One such laminate is disclosed in U.S. Pat. No. 3,524,795 (Peterson). Coextrusion apparatus used in preparing such laminates include that described in U.S. Pat. No. 3,924,990 (Schrenk), the teachings of which are incorporated herein by reference.

A coextrusion apparatus is generally designed for a specific product or combination of polymer resins. When one or more of the resins are halogenated resins, care must be taken to avoid conditions which promote dehydrohalogenation of the resin. Irrespective of the type of resin, pressure drop across a combination of a feedblock and an associated die should not be excessive if polymer leakage and machine damage are to be avoided. Pressure drop is sometimes referred to as pressure buildup or extruder head pressure. Potential machine damage includes, but is not limited to, excessive thrust bearing wear and destruction of screw flights on an extruder screw when an extruder is used to supply heat-plastified polymer to the apparatus.

It would be desirable if there were available an improved multiple extrusion feedblock suitable for extrusion of rigid vinyl chloride polymer compositions. Such a feedblock, in conjunction with an associated forming die, would beneficially have a maximum pressure buildup of 34.5 MPa.

It would also be desirable if there were available an improved multiple extrusion feedblock which permitted rapid cleaning thereof, particularly when such an apparatus includes one or more arcurate or nonlinear passageways having a length of about three inches (7.62 Centimeters) or more.

It would further be desirable if there were available an improved multiple extrusion apparatus which minimizes, if not eliminates, bolt stretching due to polymer migration at sealing surfaces.

It would still further be desirable if there were available an improved multiple extrusion apparatus which permitted rapid disassembly and reassembly in order to minimize downtime.

SUMMARY OF THE INVENTION

In one embodiment, the present invention is a modular coextrusion apparatus for preparing laminates of thermoplastic materials, the apparatus comprising:

a. a first adapter module having defined therein a passageway adapted to receive a first heat-plastified thermoplastic polymer stream, said module having a first end and a second end which are spaced apart and generally parallel and planar, the passageway having an entrance proximate to the first end of the module and an exit proximate to the second end of the module, the exit having an axis;

b. a lower conduit module having a first end and a second end which are spaced apart and generally parallel and planar, and a top and a bottom which are spaced apart and generally parallel and planar, the module having defined therein a passageway adapted to receive the first heat-plastified stream and having an entrance, an exit and an axis, the top having defined therein an arcurate channel which has a first end and a second end, the exit of the passageway and the second end of the channel terminating at the second end of the module, the first end of the lower conduit module being in operative contact with, and removably connected to, the second end of the first adapter module and aligned so that (1) the axis of the lower conduit module passageway is coaxial with the axis of the exit of the first adapter module passageway and (2) the passageways are in fluid communication with each other;

c. an upper conduit module having a first end and a second end which are spaced apart and generally parallel and planar, and a top and a bottom which are spaced apart and generally parallel and planar, the bottom having defined therein an arcurate channel, the arcurate channel having a first end and a second end, the first end of the upper conduit module being in operative contact with, and removably connected to, the second end of the first adapter module, the bottom of the upper conduit module being in operative contact with and removably connected to the top of the lower conduit module and aligned so as to form an arcurate passageway having an exit formed by the second ends of the arcurate channels and an entrance formed by the first ends of the arcurate channels, the exit having an axis which is parallel to the axis of the lower module and passageway, the entrance having an axis which is generally perpendicular to the axis of the exit;

d. a second adapter module having defined therein a passageway adapted to receive a second heat-plastified thermoplastic polymer stream, said adapter module having a first end and a second end which are spaced apart and generally parallel and planar, the passageway having an entrance proximate to the first end of the module and an exit proximate to the second end of the module, the exit having an axis, the second adapter module being in operative contact with, and removably connected to, the assembled upper and lower conduit modules so that the second adapter module passageway and the arcurate passageway are in fluid communication with each other and the axis of the second adapter module is coaxial with the axis of the entrance of the arcurate passageway;

e. a transition module having a first end and a second end, the module having defined therein a first passageway and a second passageway, each of which has a circular entrance and a generally rectangular exit, the entrances of said passageways being coplanar and the exits of said passageways being coplanar, the circular entrances each having an axis, said axes being generally parallel, the first end of the transition module being in operative contact with, and removably connected to, the second ends of the assembled upper and lower conduit modules so that the first passageway is in fluid communication with the arcurate passageway, the second passageway is in fluid communication with the lower conduit module passageway, the axis of the entrance of the first passageway is coaxial with the axis of the exit of the arcurate passageway and the axis of the entrance of the second passageway is coaxial with the axis of the lower conduit module passageway;

f. a flow rate modifying module having a first end and a second end, the module having defined therein a first generally rectangular passageway adapted to receive the second heat-plastified stream from the generally rectangular exit of the first passageway of the transition module and a generally rectangular divided passageway adapted to receive the first heat-plastified stream from the generally rectangular exit of the second passageway of the transition module, each of said rectangular passageways beginning with an entrance proximate to the first end of the module and ending in a combined exit proximate to the second end of the module, the divided passageway being subdivided into at least two parallel passageways of generally equal oross section, the second end of the transition module and the first end of the flow rate modifying module being (1) in operative contact with, and removably connected to, each other and (2) aligned so that the first rectangular passageway is in fluid communication with the first passageway of the transition module and the rectangular divided passageway is in fluid communication with the second passageway of the transition module; and g. a combining and transition module having a first end and a second end which are spaced apart and generally parallel and planar, said module having defined therein a passageway which has a generally rectangular entrance adapted to receive heat-plastified polymer from the combined exit of the flow rate modifying module and a circular exit, the first end of the combining and transition module being in operative contact with, and removably connected to, the second end of the flow rate modifying module and aligned so that the entrance is in fluid communication with the combined exit of the flow rate modifying module.

In a related embodiment, the modular coextrusion apparatus is modified to add a third adapter module. In order to accomodate this addition, the lower conduit module is suitably replaced by a central conduit module and a bottom conduit module. The replacement modules, when assembled, are suitably no larger than the module they replace. The addition also necessitates changes in the transition module and the flow rate modifying module. The changes suitably do not necessitate increasing the outer dimensions of these modules. The preference for maintaining the outer dimensions of the modules is not, however, absolute. In other words, a bottom module could be added to the lower conduit module and the other modules could be made correspondingly larger.

In the related embodiment, the modular coextrusion apparatus comprises:

a. the first adapter module;

b. a central conduit module having a first end and a second end which are spaced apart and generally parallel and planar, a first side and a second side which are spaced apart and generally parallel and planar, and a top and a bottom which are spaced apart and generally parallel and planar, the module having defined therein a passageway adapted to receive the first heat-plastified stream and having an entrance proximate to the first end of the module, an exit proximate to the second end of the module and an axis, the top having defined therein an arcurate channel which has a first end beginning at the second side of the module and a second end ending at the second end of the module, the bottom having defined therein an arcurate channel which has a first end beginning at the first side of the module and a second end ending at the second end of the module, the first end of the module being in operative contact with, and removably connected to, the second end of the first adapter module and aligned so that (1) the axis of the central conduit module is coaxial with the axis of the exit of the first adapter module passageway and (2) the passageways are in fluid communication with each other;

c. the upper conduit module, said module being in operative contact with, and removably connected to, the top of the central conduit module thereby forming a first arcurate passageway rather than to the top of the lower conduit module;

d. a bottom conduit module having a first end and a second end which are spaced apart and generally parallel and planar, a first side and a second side which are spaced apart and generally parallel and planar, and a top and a bottom which are spaced apart and generally parallel and planar, the top having defined therein an arcurate channel which has a first end proximate to the first side of the module and a second end proximate to the second end of the module, the first end of the bottom conduit module being in operative contact with, and removably connected to, the second end of the first adapter module, the top of the bottom conduit module being in operative contact with, and removably connected to, the bottom of the central conduit module and aligned so as to form a second arcurate passageway having an exit formed by the second ends of the arcurate channels of the bottom and central conduit modules, the exit having an axis which is parallel to the axis of the central conduit module passageway, and an entrance formed by the first ends of the bottom and central conduit modules, the entrance having an axis which is generally perpendicular to the axis of the exit;

e. the second adapter module, said module being in operative contact with, and removably connected to, the assembled upper and central conduit modules so that the second adapter module passageway and the first arcurate passageway are in fluid communication with each other and the axis of the second adapter module is coaxial with the axis of the entrance of the first arcurate passageway;

f. a third adapter module having defined therein a passageway adapted to receive a third heat-plastified thermoplastic stream, said adapter module having a first end and a second end which are spaced apart and generally parallel and planar, the passageway having an entrance proximate to the first end of the module, an exit proximate to the second end of the module and an axis, the third adapter module being in operative contact with, and removably connected to, the assembled central and bottom conduit modules so that the third adapter module passageway and the second arcurate passageway are in fluid communication with each other and the axis of the third adapter module passageway is coaxial with the axis of the entrance of the second arcurate passageway;

g. a modified transition module having a first end and a second end, the module having defined therein a first passageway, a second passageway and a third passageway, each of which has a circular entrance proximate to the first end of the module and a generally rectangular exit proximate to the second end of the module, each of the entrances having an axis parallel to the axes of the other entrances, the entrances being coplanar and the exits being coplanar, the first end of the modified transition module being in operative contact with, and removably connected to, the second ends of the assembled upper, central and bottom conduit modules so that the first passageway is in fluid communication with the first arcurate passageway, the second passageway is in fluid communication with the central conduit module passageway, the third passageway is in fluid communication with the second arcurate passageway, the axis of the entrance of the first passageway is coaxial with the axis of the exit of the first arcurate passageway, the axis of the entrance of the second passageway is coaxial with the axis of the central conduit module passageway and the axis of the entrance of the third passageway is coaxial with the axis of the exit of the second arcurate passageway;

h. a modified flow rate modifying module having a first end and a second end, the module having defined therein a first generally rectangular passageway adapted to receive the second heat-plastified stream from the generally rectangular exit of the first transition module passageway, a generally rectangular divided passageway adapted to receive the first heat-plastified stream from the generally rectangular exit of the second transition module passageway and a second generally rectangular passageway adapted to receive the third heat-plastified stream from the generally rectangular exit of the third transition module passageway, each of said rectangular passageways beginning with a separate entrance proximate to the first end of the module and ending in a combined exit proximate to the second end of the module, the divided passageway being subdivided into at least two parallel passageways of generally equal cross section, the second end of the modified transition module and the first end of the modified flow rate modifying module being (1) in operative contact with, and removably connected to, each other and (2) aligned so that the first rectangular passageway is in fluid communication with the first passageway of the transition module, the divided passageway is in fluid communication with the second passageway of the transition module and the second rectangular passageway is in fluid communication with the third passageway of the transition module; and i. the combining and transition module.

The term "generally planar" means that a surface is planar save for recesses or projecting faces. The recesses and projecting faces are beneficially planar and parallel to the surface from which they project or are recessed.

The modules, with the exception of the second adapter module in the first embodiment and the second and third adapter modules in the related embodiment, are beneficially held in position by an external fastening means, e.g., a plurality of tie bars. The external fastening means facilitate rapid disassembly of the apparatus. This is particularly important when the apparatus is used in conjunction with heat sensitive polymers. The external fastening means also minimizes apparatus mass thereby facilitating faster heat-up and more accurate temperature control. The fastening means further apply an amount of compressive force upon the modules. The compressive force, in conjunction with a large enough sealing surface diameter to minimize, if not eliminate, joint rotation and sufficient seal area relief to reduce the pressure area generated by leaking or migrating polymer, provides sufficient sealing stress to achieve a generally leak-free seal between adjacent modules. Some polymer migration is expected irrespective of the compressive force applied by the fastening means. This does not cause a problem, however, because it drains to the seal relief area and no longer exerts pressure to force modules apart and thereby stretch the fastening means. Such stretching is irreversible and may lead to interruption of operations in order to replace fastening means. Replacement of fastening means generally necessitates complete disassembly, cleaning and subsequent reassembly of the apparatus. Such interruptions are desirably avoided.

Further features and advantages of the present invention will become more apparent from the following specification taken in connection with the drawings.

BRIEF DESCRIPTION OF THE DRAWINGS

FIG. 7 is an expanded top plan view of the upper conduit module shown in FIG. 5.

FIG. 8 is an end view of one embodiment of the transition module, less an insert, of the apparatus of FIG. 1.

FIG. 9 is an expanded end view of one embodiment of an insert suitable for use in conjunction with the transition module of FIG. 8.

FIG. 15 is an end view of one embodiment of the combining and transition module of the apparatus of FIG. 1.

FIG. 16 is a cross section of the combining and transition module taken along the line 16—16 of FIG. 15.

DESCRIPTION OF THE PREFERRED EMBODIMENTS

Figure 1:
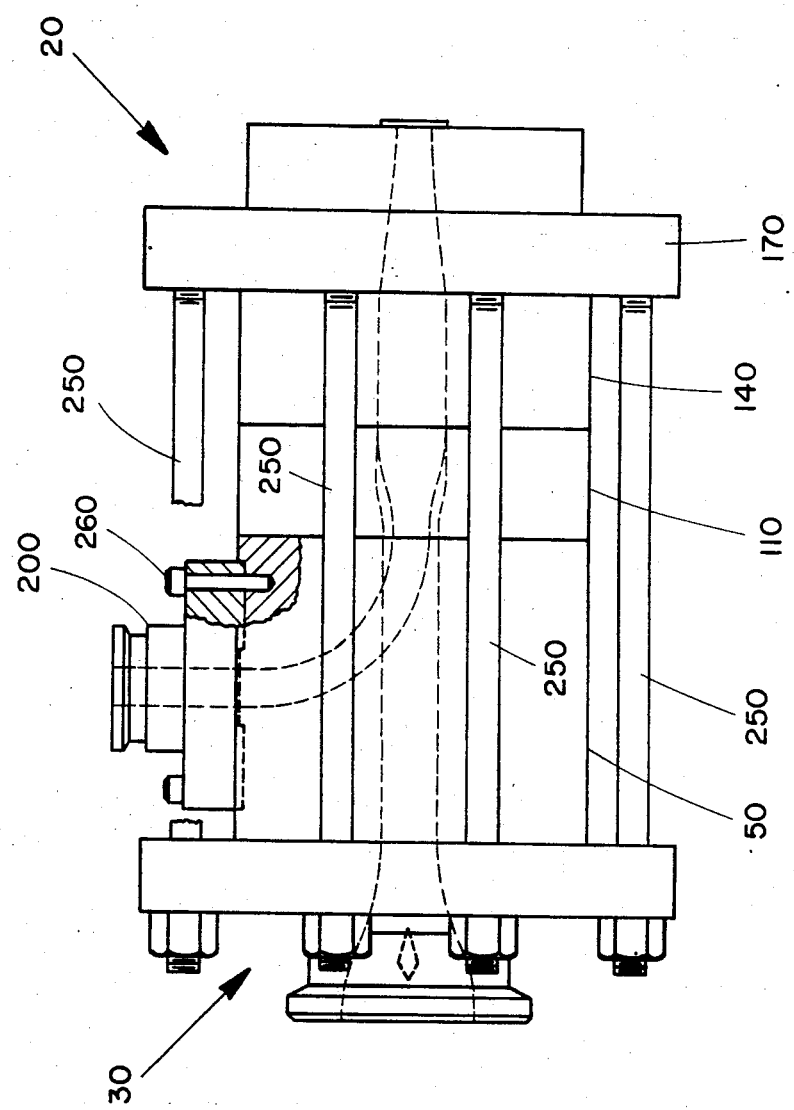
FIG. 1 is a top plan view, partially cutaway and partially in section, of an assembled, modular coextrusion apparatus in accordance with the present invention.

In FIG. 1 there is schematically depicted an apparatus in accordance with the present invention generally designated by the reference numeral 20. The apparatus 20 comprises a first adapter module 30, an upper conduit module 50, a lower conduit module 80 (not shown), a transition module 110, a flow rate modifying module 140, a combining and transition module 170, a second adapter module 200 and a plurality of external fastening means 250, four of which are shown in FIG. 1. The fastening means 250 are adapted to maintain the first adapter module 30, the upper conduit module 50, the lower conduit module 80 (not shown), the transition module 110, the flow rate modifying module 140 and the combining and transition module 170 in fixed but removable relationship to each other. Fastening means 260 secure the second adapter module 200 in a fixed but removable relationship to assembled upper and lower conduit modules 50 and 80.

Figure 3:
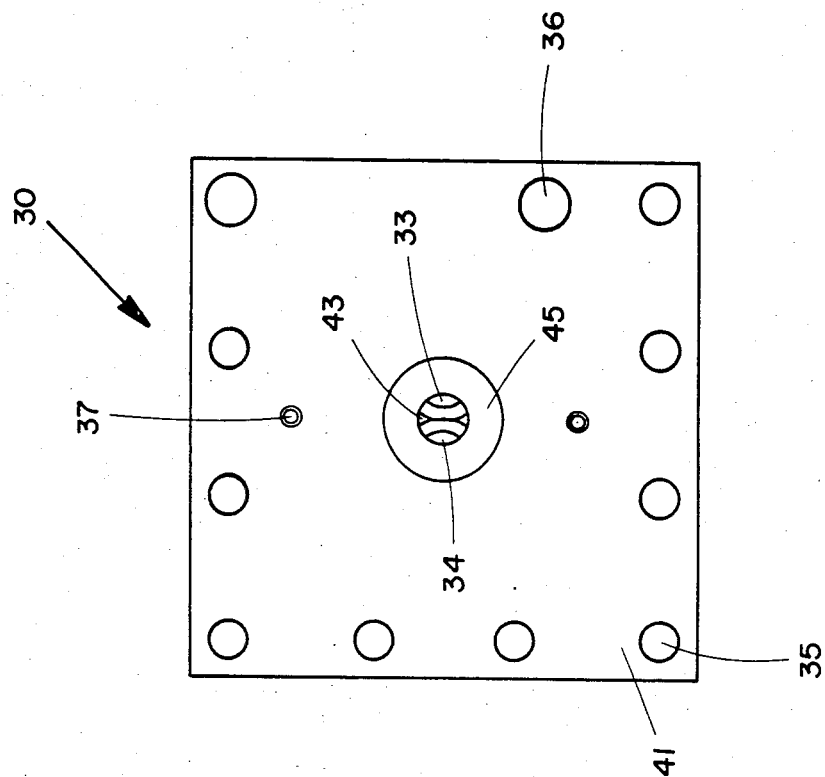
FIG. 3 is an opposing end view of the first adapter module shown in FIG. 2.
Figure 2:
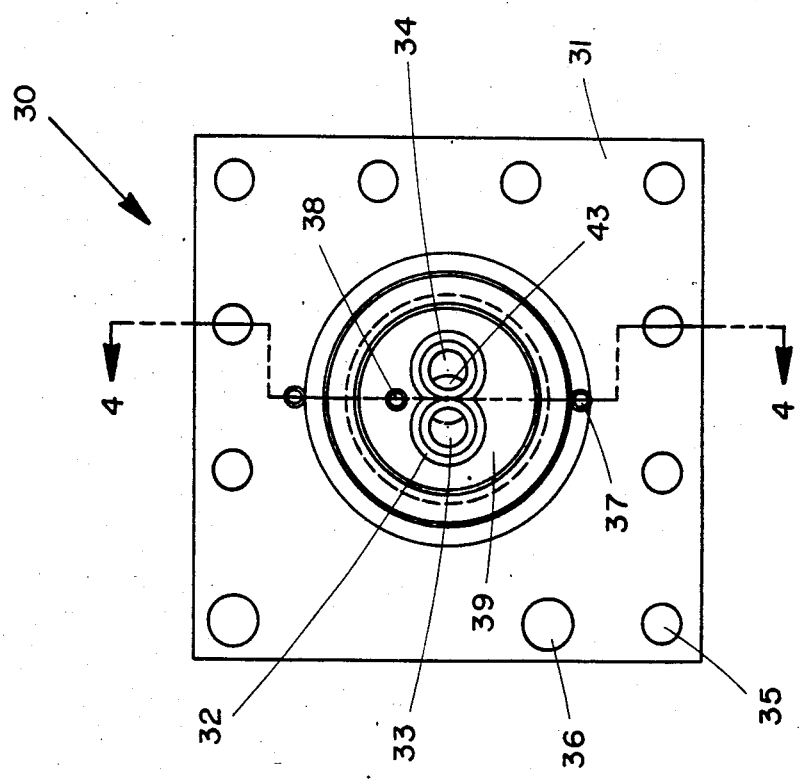
FIG. 2 is an end view of one embodiment of the first adapter module of the apparatus of FIG. 1.

In FIGS. 2 and 3, there are schematically depicted opposing end views of a first adapter module 30. The first adapter module 30 has a first or inlet end 31 (FIG. 2) and a second or discharge end 41 (FIG. 3). The module 30 has defined therein a first inlet passageway 32 having a first inlet end 33, a second inlet end 34 and a discharge end 43. Molten or heat-plastified polymer material (not shown) entering inlet ends 33 and 34 of passageway 32 converges within said passageway 32 to exit module 30 via discharge end 43 as a single stream. The first adapter module 30 shown in FIGS. 2 and 3 is suitable for use in conjunction with a twinscrew extruder as a heat-plastified polymer source. If a single screw extruder or a melt pump is used as the polymer source, the first inlet passageway would have a single entrance.

The module 30 also has defined therein two stepped, smooth-surfaced apertures 37 and a smooth surfaced recess 38. The apertures 37 accomodate aligning pins (not shown) to ensure proper alignment between module 30 and assembled modules 50 and 80. The recess 38 accomodates an aligning pin (not shown) to ensure proper alignment of a first molten polymer source (not shown) with the module 30. The aligning pins suitably fit snugly but removably in said recesses. The present invention is not limited to use of aligning pins, either smooth-surfaced or surface modified. Other means of maintaining alignment may also be used with any of the modules described herein.

In the embodiment shown in FIGS. 2 and 3, the module 30 has defined therein nine smooth-surfaced apertures 35 and two smooth-surfaced apertures 36, the apertures 36 having a greater diameter than the apertures 35. Each of the apertures 35 and 36 has an axis. The axes are equally spaced except that spacing between the axes of adjacent apertures 36 is about double that of spacing between the axes of two adjacent apertures 35. The spacing of apertures 36 is necessary to allow attachment of the second adapter module 200 to upper conduit module 50 and lower conduit module 80 without interference by a fastening means 250. The larger size of apertures 36 accomodates larger fastening means (not shown) needed to take up stress which would otherwise be taken up by another aperture 35 spaced equidistant from the axes of the apertures 36. Because of the unequal, asymmetric spacing and size of apertures 35 and 36, each fastening means 250 beneficially has a different torque setting.

Figure 4:
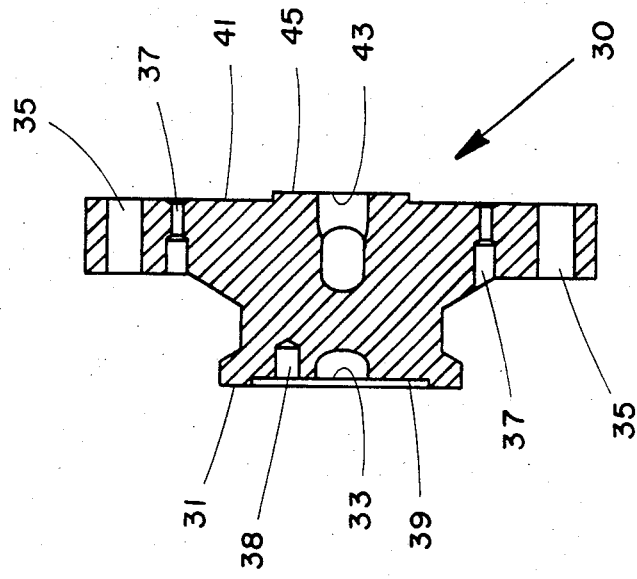
FIG. 4 is a cross-section of the first adapter module taken along the line 4—4 of FIG. 2.

In FIG. 4, there is depicted a cross-section of the module 30 taken along the line 4—4 of FIG. 2 showing the first inlet end 33 and the discharge end 43 of the first inlet passageway, two apertures 35, two stepped apertures 37 and recess 38. FIG. 4 also shows that the module 30 has an inlet end 31 and a discharge end 41. The inlet end 31 defines a generally planar and circular recess 39. The recess 39 is shaped so as to receive a circular projecting face of a discharge end of a source (not shown) of heat-plastified polymer material. If the discharge end has a non-circular projecting face, recess 39 is suitably changed so that it conforms to said projecting face. The discharge end 43 of module 30 defines a generally circular, planar projecting face 45 (also shown in FIG. 3). The inlet ends 33 and 34 of inlet passageway 32 begin at recess 39. The discharge end 43 of inlet passageway 32 terminates at face 45.

Figures 5, 6:
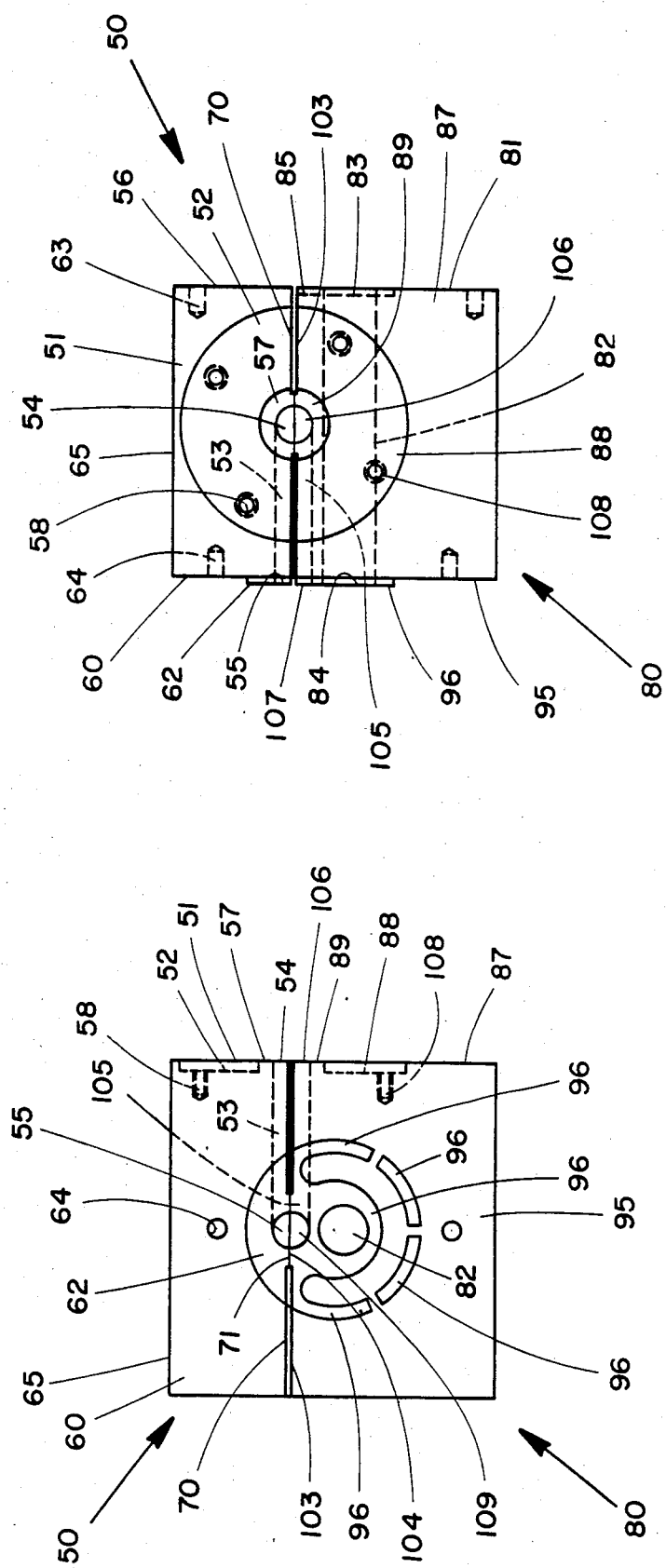
FIG. 5. is an end view of the assembled upper and lower conduit modules of the apparatus of FIG. 1.
FIG. 6. is a side elevation of the assembled upper and lower conduit modules shown in FIG. 5.
Figure 11:
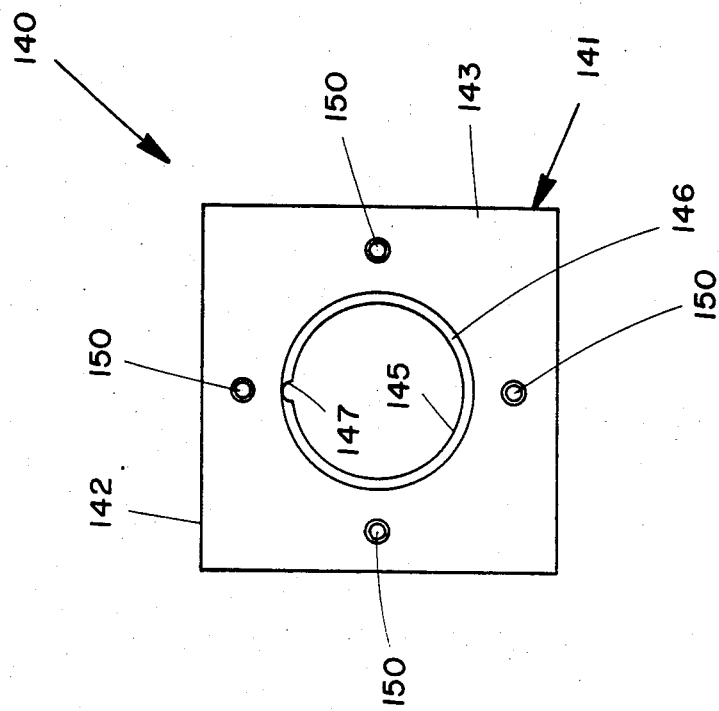
FIG. 11 is an end view of one embodiment of the flow rate modifying module, less an insert, of the apparatus of FIG. 1.

In FIGS. 5 and 6 there are schematically depicted, respectively, an end view and a side view of combined or assembled upper conduit module 50 and lower conduit module 80.

The upper conduit module 50 has a top 65, a bottom 70, an inlet end 51, a first end 56 and a second or discharge end 60. The first end 56 and the second end 60 are spaced apart and generally parallel. The inlet end 51 is suitably a planar surface which is generally perpendicular to ends 56 and 60. The bottom 70 of module 50 has defined therein a generally arcurate channel 53 having an inlet end 54 and a discharge end 55. The bottom 70 also defines a raised boss or projecting face 71 which conforms to both sides of arcurate channel 53. The inlet end 51 of the module 50 defines a generally semicircular-shaped recess 52 which in turn defines a generally planar, semicircular-shaped projecting face 57. Recess 52 has defined therein two internally screwthreaded recesses 58. The recesses 58 are adapted to receive fastening means 260, such as cap screws (shown in FIG. 1), which are used to keep the second adapter module 200 (shown in FIG. 1) properly oriented with respect to recess 52 and inlet end 51 of module 50. The discharge end 60 of module 50 defines a generally planar projecting face 62. Projecting face 62 is shaped like an arcurate portion of a circle. Discharge end 60 has defined therein at least one smooth-surfaced aperture 64 adapted to receive an aligning pin (not shown). The aligning pin serves to maintain the transition module 110 in a fixed orientation with respect to combined modules 50 and 80 when the assembled modules are adjacent to module 110 as shown in FIG. 1. The first end 56 has defined therein at least one smooth-surfaced aperture 63 (shown only in FIG. 6) adapted to receive an aligning pin (not shown). The aligning pin serves to maintain the first adapter module 30 in a fixed orientation with respect to combined modules 50 and 80 when apparatus 20 is assembled as in FIG. 1 said combined modules are adjacent to module 30.

Lower conduit module 80 has a first inlet end 81 (shown only in FIG. 6), a second inlet end 87, a discharge end 95 and a top 103. Module 80 has defined therein a passageway 82 having an inlet end 83 and a discharge end 84. The top 103 of module 80 has defined therein a generally arcurate channel 105 having an inlet end 106 and a discharge end 107. The top 103 also defines a raised boss or projecting face 104 which conforms to both sides of arcurate channel 105. The second inlet end 87 defines a generally semicircular-shaped recess 88 which in turn defines a generally planar, semicircular-shaped projecting face 89. Recess 88 has defined therein two internally screw-threaded recesses 108. The recesses 108 are adapted to receive fastening means 260, such as cap screws (shown in FIG. 1), which are used to keep the second adapter module 200 (shown in FIG. 1) properly oriented with respect to recess 88 and second inlet end 87 of module 80. Inlet end 81 has defined therein a generally planar, circular recess 85. The discharge end 95 of module 80 defines a generally planar, segmented projecting face 96. Segmented projecting face 96 provides a means for draining away molten or heat-plastified polymer should it leak from passageway 82 while flowing through apparatus 20 when said apparatus is assembled as shown in FIG. 1. The inlet end 106 of accurate channel 105 begins at face 89. Discharge end 107 of accurate channel 105 and discharge end 84 of passageway 82 terminate at projecting face 96.

Recess 52 and recess 88 combine to form a doughnut-shaped recess which is adapted to receive a projecting face of the second adapter module 200 when apparatus 20 is assembled as shown in FIG. 1. Recess 85 is adapted to receive projecting face 45 of the first adapter module 30 when apparatus 20 is assembled as shown in FIG. 1. In FIG. 7, there is schematically depicted a view of the top 65 of upper conduit module 50, an accurate passageway 109 formed by combining generally arcurate channels 53 and 105, boss 71 superimposed over boss 104, and passageway 82. Also shown in FIG. 7 are recess 85 defined in inlet end 81 of lower conduit module 60 of module 50. The top 65 has defined therein seven internally screw-threaded apertures 66. The apertures 66 are coaxial with a like number of internally screw-threaded recesses (not shown) in the top 103 (not shown) of lower conduit module 80. The apertures 66 are spaced so that an equal force will be applied to each side of arcurate passageway 109 when screw-threaded fasteners (not shown) are threadably engaged in apertures 66 and corresponding screw-threaded recesses. Because of the unequal spacing of apertures 66, each fastener beneficially has a different torque setting. Suitable torque settings are readily calculable. The fasteners are beneficially socket head cap screws. Other fasteners may be used provided they result in equal force being applied to both sides of passageway 109. The number of apertures and corresponding recesses may vary, if desired, provided sufficient force is applied to achieve a generally leakproof arcurate passageway 109. Top 65 also has defined therein at least two smooth-surfaced apertures 59. The apertures 59 are coaxial with corresponding apertures (not shown) in lower conduit module 80. The apertures, both 59 and those in module 80, are adapted to receive aligning pins (not shown). The aligning pins serve to maintain the upper conduit module 50 and the lower conduit module 80 in a fixed orientation with respect to each other when the modules are assembled as shown in FIGS. 5 and 6.

Washers (not shown) are placed between the bottom 70 (FIG. 6) of upper conduit module 50 and the top 103 (FIG. 6) of lower conduit module 80 so they are coaxial with the screw-threaded recesses (not shown) in top 103 of module 80 and corresponding screw-threaded apertures 66 in top 65 of module 50. The washers have a thickness which is large enough to generally preclude tilting of raised boss 71 around arcurate channel 53 with respect to raised boss 104 around arcurate channel 105. The washers are also thin enough so as to allow boss 71 to seat firmly against boss 104 so as to generally preclude leakage of molten polymer from passageway 109.

Figure 10:
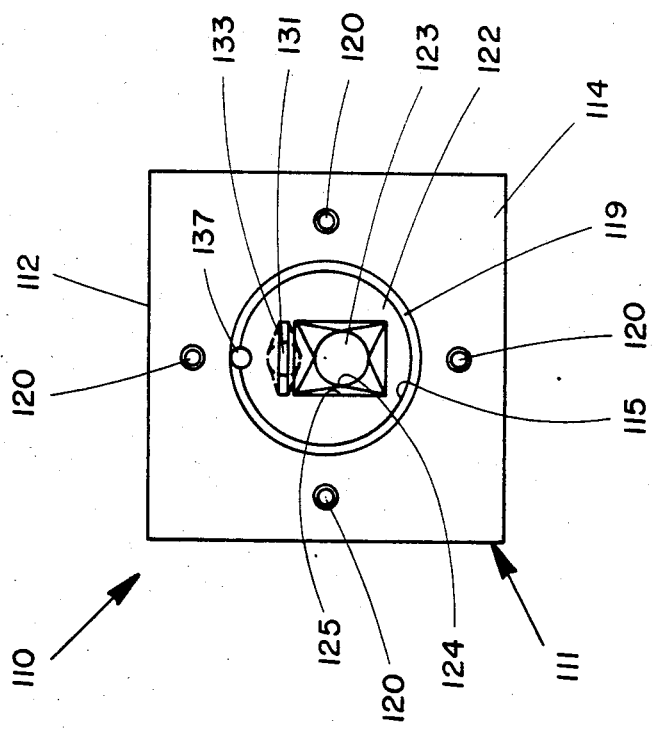
FIG. 10 is an opposing end view of the transition module of FIG. 8 with the insert of FIG. 9 in place.

In FIGS. 8, 9 and 10 there are depicted respectively an end view of a transition module 110 less an insert, an expanded end view of an insert 122 suitable for use with transition module 110 and an opposing end view of an assembled transition module 110. The transition module 110 comprises an insert 111 and a replaceable insert 122. The insert holder 111 has a top 112, an inlet end 113 (FIG. 8) and a discharge end 114 (FIG. 10).

The insert holder 111 has defined therein a generally circular passageway 115, said passageway having an axis. The inlet end 113 has defined therein a generally circular shaped recess 116 circumscribing a generally circular passageway 115. The holder 111 also has defined therein a groove or channel 117 having a semicircular cross-section and parallel to the axis of the aperture 115. The discharge end 114 of holder 111 defines a generally planar, ring-shaped projecting face 119. Face 119 is coaxial with aperture 115. The holder 111 also has defined therein four stepped, smooth surfaced apertures 120 adapted to receive aligning pins (not shown). The aligning pins, when in place, serve to maintain the combined modules 50 and 80 in a fixed orientation with respect to transition module 110 when apparatus 20 is assembled as shown in FIG. 1.

Insert 122 has the general configuration of a right cylinder. It has defined therein a first transition passageway 123 and a second transition passageway 131. The first transition passageway 123 has an inlet end 124 having a generally circular cross-section and a discharge end 125 having a generally rectangular cross-section. The rectangular cross-section of the discharge end 125 has a height which exceeds its width. The second transition passageway 131 has an inlet end 132 having a generally circular cross-section and a discharge end 133 having a generally rectangular cross-section. The rectangular cross-section of discharge end 133 has a width which exceeds its height, said width being generally equal to the width of the discharge end 125 of the first transition passageway 123. Insert 122 also has defined therein a longitudinal groove 135, said groove being generally parallel to the axes of inlet ends 124 and 132. When the insert holder 111 and the insert 122 are assembled so that grooves 117 and 135 combine to form a generally circular aperture, a pin or rod 137 (shown only in FIG. 10) may be used to preclude rotation of the insert 122 within aperture 115 of the insert holder 111.

The passageway 115 of insert holder 111 of insert 122 need not be configured as a right cylinder. These shapes are preferred for ease of machining. For example, the insert 122 may have a cross section in the shape of an ellipse, a triangle, a square or a rectangle provided the passageway 115 has the same shape.

When assembled, arcurate passageway 109 is in fluid communication with second transition passageway 131 and passageway 82 is in fluid communication with first transition passageway 123. Also, when assembled, projecting face 62 and projecting face 96 fit within recess 116.

Figure 13:
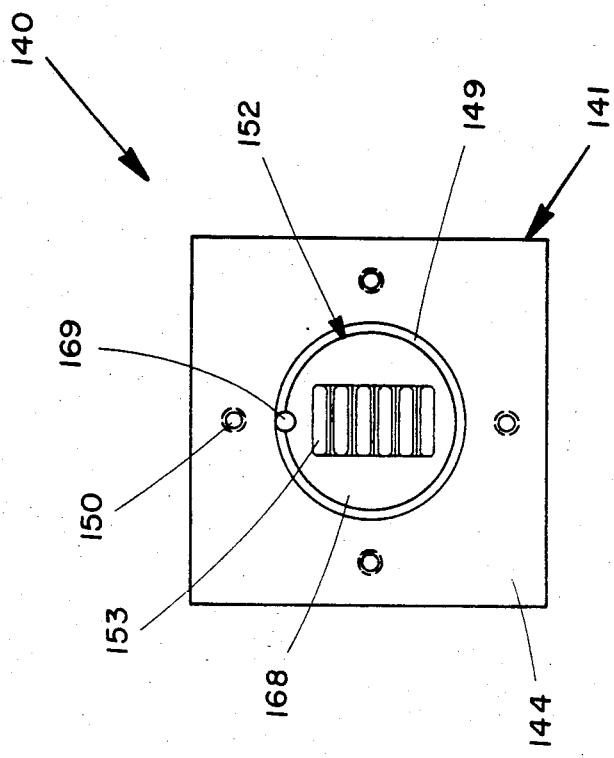
FIG. 13 is an opposing end view of the flow rate modifying module of FIG. 11 with the insert of FIG. 12 in place.
Figure 12:
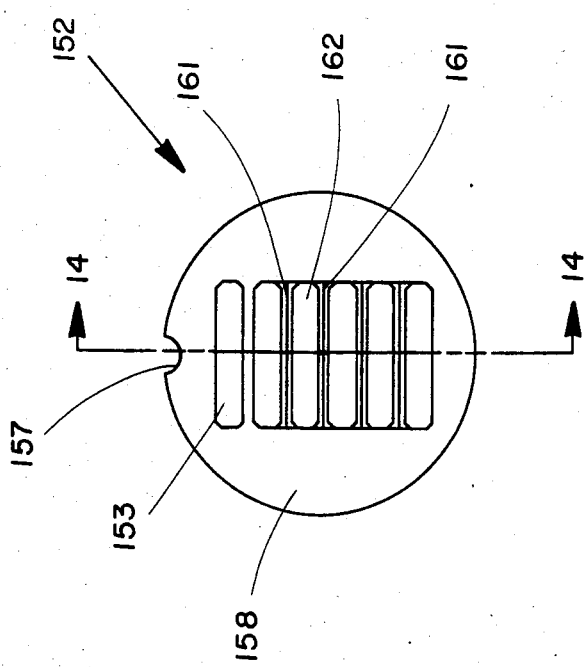
FIG. 12 is an expanded end view of one embodiment of an insert suitable for use in conjunction with the flow rate modifying module of FIG. 11.

In FIGS. 11, 12 13 and 14 there are depicted respectively an end view of a flow rate modifying module 140 less an insert, an expanded end view of an insert 152 suitable for use with flow rate modifying module 140, an opposing end view of an assembled flow rate modifying module 140, and a cross section of insert 152 taken along the line 14—14 of FIG. 12. Module 140 comprises an insert holder 141 and a replaceable insert 152. Insert holder 141 has a top 142, an inlet end 143 (FIG. 11) and a discharge end 144 (FIG. 13). Insert holder 141 has also defined therein a passageway 145. Inlet end 143 has defined therein a generally circular shaped recess 146, said recess 146 circumscribing and being coaxial with

11 passageway 145. Holder 141 also has defined therein a groove 147 having a semicircular cross-section and paralleling the axis of passageway 145. Discharge end 144 of holder 141 defines a generally planar, ring-shaped projecting face 149. Face 149 is coaxial with aperture 145. Holder 141 also has defined therein four stepped, smooth surfaced apertures 150 adapted to receive aligning pins (not shown). The aligning pins, when in place, serve to maintain transition module 110 in a fixed orientation with respect to flow rate modifying module 140 when apparatus 20 is assembled as shown in FIG. 1.

Figure 14:
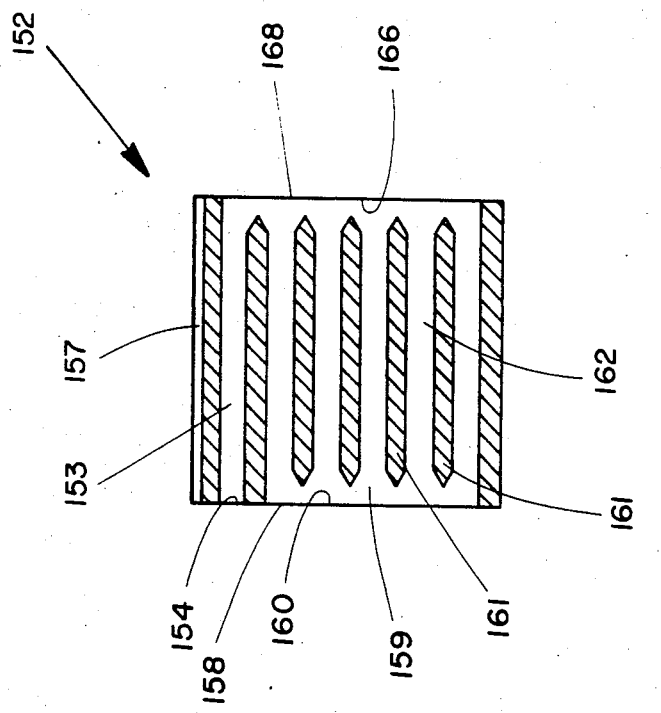
FIG. 14 is an expanded cross-sectional view of the flow rate modifying module insert taken along the line 14—14 of FIG. 12.

As shown most clearly in FIG. 14, insert 152 has defined therein a first rectangular feed passageway 153 and a divided passageway 159. Insert 152 has the general configuration of a right cylinder. Insert 152 has a first side 158 (FIGS. 12 and 14) and an opposing, generally parallel second side 168 (FIGS. 13 and 14). Feed passageway 153 begins with an inlet end 154 and ends in a common discharge end 166. Feed passageway 153 has a cross section generally equal to that of the discharge end of 133 of the second transition passageway 131 of insert 122. Divided passageway 159 begins with an inlet end 160 and ends in a common discharge end 166. Within the inlet end 160 are disposed a plurality of generally parallel, equally spaced dividers 161 defining therebetween a plurality of feed slots 162. The feed slots 162 are beneficially of equal dimensions and provide fluid communication between the inlet 160 and the common discharge end 166. Insert 152 also has defined therein a longitudinal groove 157, said groove being generally parallel to dividers 161. When the insert holder 141 and the insert 152 are assembled so that grooves 147 and 157 combine to form a generally circular aperture, a pin or rod 169 (shown only in FIG. 13) may be used to preclude rotation of insert 152 within the aperture 145 of insert holder 141.

When assembled with insert 152 in place, second transition passageway 131 is in fluid communication with the first rectangular feed passageway 153 and first transition passageway 123 is in fluid communication with divided passageway 159. Also, when assembled, ring-shaped projecting face 119 fits within recess 146. As with insert 122 and passageway 115 of insert holder 111, the particular shape of insert 152 and of passageway 145 of insert holder 141 is not critical so long as the shape of passageway 145 is the same as that of insert 152. In other words, the outer surface of insert 152 must conform to the inner surface of passageway 145.

In FIGS. 15 and 16 there are depicted respectively an end view of a combining and transition module 170 and a cross-sectional view of said module 170 taken along the line 16—16 of FIG. 15. Module 170 has an inlet end 171 and an opposing discharge end 184. Module 170 has defined therein a feedblock discharge passageway 172 having an inlet end 173 and a discharge end 185. Inlet end 173 has a rectangular cross-section equal to that of the combined discharge end 166 of insert 152 of flow rate modifying module 140. Discharge end 185 has a generally circular cross-section. Inlet end 171 of module 170 has defined therein a generally circular and planar recess 174 having an axis which is coaxial with that of the discharge end 185. Projecting face 149 of flow rate modifying module 140 fits within recess 174 when apparatus 20 is assembled as in FIG. 1. Module 170 also has defined therein a plurality of countersunk, smooth surfaced apertures 176, the countersunk portion being

12 proximate to inlet end 171 of module 170. The apertures 176 are adapted to receive fastening means (not shown), such as cap screws, which are used to bolt a forming die (not shown) to discharge end 184. Module 170 further has defined therein a plurality of internally screw-threaded apertures 177 and two larger internally screw-threaded apertures 178. Each of the apertures 177 and 178 has an axis which is coaxial respectively with apertures 35 and 36 defined in first adapter module 30 when apparatus 20 is assembled as in FIG. 1. The larger size of apertures 178 and the spacing of apertures 177 and 178 are advanced for the reasons set forth size and spacing of apertures 35 and 36. Inlet end 171 of module 170 has defined therein two countersunk surfaced apertures 179. Apertures 179 are adapted to receive aligning pins (not shown) to preclude rotation of module 170 with respect to module 140 when the apparatus 20 is assembled as in FIG. 1. Discharge end 184 of module 170 defines an axially extending ring-shaped face 186. Inlet end 173 of feedblock discharge passageway 172 begins at recess 186. Discharge end 185 of said passageway 172 terminates at face 186. Inlet end 173 of module 166 and combined discharge end 166 of module 140 are in fluid communication when apparatus 20 is assembled as in FIG. 1.

Figure 18:
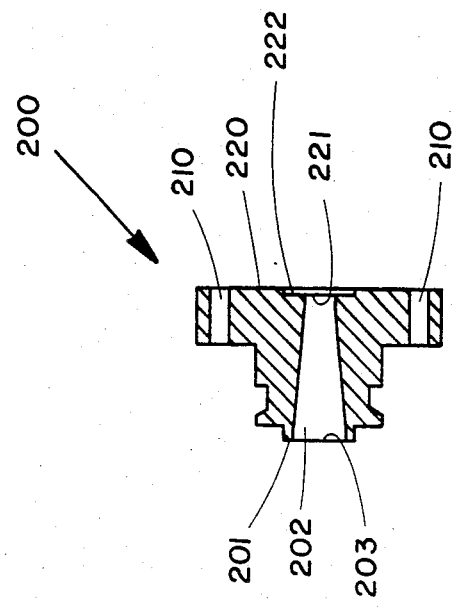
FIG. 18 is a cross-section of the second adapter module taken along the line 18—18 of FIG. 17.
Figure 17:
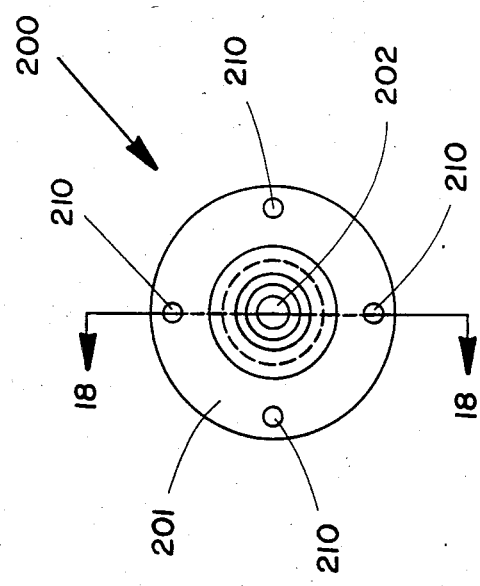
FIG. 17 is an end view of one embodiment of the second adapter module of the apparatus of FIG. 1.

In FIGS. 17 and 18 there are schematically depicted respectively an end view of a second adapter module 200 and a cross-sectional view of said module 200 taken along the line 18—18 of FIG. 17. Module 200 has a first or inlet end 201 and a second or discharge end 220. Module 200 has defined therein an inlet passageway 202 having an inlet end 203 and a discharge end 221. The discharge end 220 of module 200 has defined therein a generally circular, planar recess 222, said recess 222 having an axis which is coaxial with that of the discharge end 221 of passageway 202. The recess 222 is adapted to fit over projecting face 89 of lower conduit module 80 and over projecting face 57 of upper conduit module 50 when the apparatus 20 is assembled as in FIG. 1. Module 200 also has defined therein a plurality of smooth surfaced apertures 210. The apertures 210 are spaced so that each aperture 210 is coaxial with either an internally screw-threaded recess 58 defined in inlet end 51 of module 50 or an internally screw-threaded recess 108 defined in the second inlet end 87 of module 80. With fastening means 260, such as a cap screw (FIG. 1), module 200 is operatively and removably connected to combined modules 50 and 80 so as to preclude rotation of module 200 with respect to combined modules 50 and 80. When apparatus 20 is assembled as shown in FIG. 1, the inlet passageway 202 is in fluid communication with arcurate passageway 109 formed by combined modules 50 and 80.

When apparatus 20 is assembled as shown in FIG. 1, first inlet passageway 32, passageway 82, first transition passageway 123, divider passageway 159 and feedblock discharge passageway 172 combine to form a first continuous melt flow passageway. Similarly, inlet passageway 202, arcurate passageway 109, second transition passageway 131, feed passageway 153 and feedblock discharge passageway 172 combine to form a second continuous melt flow passageway. In operation of apparatus 20, a first heat-plastified thermoplastic resinous material flows from a first source (not shown) through the first continuous melt flow passageway and a second heat-plastified thermoplastic resinous material flows from a second source (not shown) through the second continuous melt flow passageway. A single layer of the second heat-plastified thermoplastic resinous material is combined as a cap layer with a plurality of layers of the first heat plastified thermoplastic resinous material in the feedblock discharge passageway 172. The combined layers are fed into a forming die (not shown) and subsequently handled by conventional means to provide a formed product having a top or cap layer of thermoplastic resin bonded to a base layer of thermoplastic resin. The thermoplastic resins may be identical, similar or quite different depending upon proposed uses of the formal product.

When apparatus 20 is assembled as shown in FIG. 1, sealing surfaces are formed between modules by placing a projecting face of one module within a recess of a second module, the recess being adapted to receive said projecting face. The sealing surfaces are beneficially designed to have a seal relief at least double the extruder head pressure. In other words, with a maximum extruder head pressure of 34.5 MPa, the seal relief is beneficially at least 69 MPa. The preference for having a seal relief double that of the extruder head pressure is not absolute. The seal relief must, however, be at least equal to the extruder head pressure.

The modular coextrusion apparatus or feedblock in conjunction with a conventional sheeting die, provides a maximum extruder head pressure which is suitably less than about 5000 psi (34.5 MPa). By adjusting internal physical dimensions of the apparatus, such as volume and length of passageways, and volumetric flow rates of heat-plastified polymers through the apparatus, variations in extruder head pressure and residence time of polymers within the apparatus occur. For a given passageway volume, extruder head pressure will increase and residence time will decrease as the volumetric flow rate increases. Conversely, for that same volume, extruder head pressure will decrease and residence time will increase as the volumetric flow rate decreases. Extruder head pressures of less than about 5000 psi (34.5 MPa), e.g., about 4000 psi (27.6 MPa) or about 3500 psi (24.1 MPa) are quite satisfactory as potential for machine damage decreases with lower extruder head pressures. At the same time, care must be taken to provide a residence time which is benficially less than that at which dehydrohalogenation or burning of the polymer occurs. It has been found that a residence time of about 66 seconds and a temperature of 385° to 400° Fahrenheit (196° to 204° Centigrade) produces satisfactory results whereas a residence time of 130 seconds and a temperature of 400° Fahrenheit (204° Centigrade) promotes dehydrohalogenation.

The modules are suitably machined from a high strength tool steel capable of maintaining its strength at elevated temperatures, particularly those associated with melt processing polymers. The steel is desirably classified as H13 tool steel by AISI, the American Iron & Steel Institute. If a high strength steel is not used, module size necessarily must increase because allowable stresses of low strength steel are markedly lower than those of high strength steel. With increasing module size and passageway length, extruder head pressure also increases. In other words, the use of a high strength steel yields a modular coextrusion apparatus with shorter polymer passageways.

The fastening means 250 and 260 and screw threaded fasteners are beneficially fabricated from high strength steels. Low strength steel fastening means could be used, but are not preferred because additional fastening means would be required to provide equivalent sealing stresses.

Apparatus in accordance with the present invention are suitably employed with any extrudable polymeric material. Such apparatus are beneficially employed with thermoplastic synthetic resins. The apparatus are desirably employed with vinyl halide polymer resins or blends of such resins with halogenated polyolefin resins. The apparatus are preferably used with rigid polyvinyl chloride resins, particularly when said resins are blended with a minor amount of a halogenated polyolefin such as chlorinated polyethylene. Particularly suitable results are obtained when a cap layer of highly filled rigid polyvinyl chloride is applied to a base layer of rigid polyvinyl chloride containing a lower filler loading. The filler is beneficially titanium dioxide. It is present in the cap layer in an amount of from about eight to about ten parts by weight per hundred parts of polyvinyl chloride. It is also present in the base layer in an amount of from about one to about three parts by weight per hundred parts of polyvinyl chloride. Both layers beneficially contain from about three to about six parts by weight of chlorinated polyethylene per hundred parts of polyvinyl chloride.

A chemical or gaseous fluorocarbon blowing agent could be added to resin formulations used to prepare one or more layers of a coextruded polymer structure. In this manner, a coextruded structure having at least one foam layer could be prepared.

As is apparent from the foregoing specification, the present invention is susceptible of being embodied with various alterations and modifications which may differ particularly from those that have been described in the preceding specification and description. By way of illustration, one or more additional adapter modules could be added to the apparatus. In addition, the internal configuration of the adapter modules may be varied to accomodate different means of supplying heat-plastified thermoplastic polymers. For this reason, it is to be fully understood that all of the foregoing is intended to be merely illustrative and is not to be construed or interpreted as being restrictive or otherwise limiting of the present invention.

What is claimed is:

1. A modular coextrusion apparatus for preparing laminates of thermoplastic materials, the apparatus comprising:
   a. a first adapter module having defined therein a passageway adapted to receive a first heat-plastified thermoplastic polymer stream, said module having a first end and a second end which are spaced apart and generally parallel and planar, the passageway having an entrance proximate to the first end of the module and an exit proximate to the second end of the module, the exit having an axis;
   b. a lower conduit module having a first end and a second end which are spaced apart and generally parallel and planar, and a top and a bottom which are spaced apart and generally coplanar, the module having defined therein a passageway adapted to receive the first heat plastified stream and having an entrance, an exit and an axis, the top having defined therein an arcurate channel which has a first end and a second end, the exit of the passageway and the second end of the channel terminating at the second end of the module, the first end of the lower conduit module being in operative contact with, and removably connected to, the second end of the first adapter module and aligned so that (1) the axis of the lower conduit module passageway is coaxial with the axis of the exit of the first adapter module passageway and (2) the passageways are in fluid communication with each other;
c. an upper conduit module having a first end and a second end which are spaced apart and generally parallel and planar, and a top and a bottom which are spaced apart and generally parallel and planar, the bottom having defined therein an arcurate channel, the arcurate channel having a first end and a second end, the first end of the upper conduit module being in operative contact with, and removably connected to, the second end of the first adapter module, the bottom of the upper conduit module being in operative contact with, and removably connected to, the top of the lower conduit module and aligned so as to form an arcurate passageway having an exit formed by the second ends of the arcurate channels and an entrance formed by the first ends of the arcurate channels, the exit having an axis which is parallel to the axis of the lower module passageway, the entrance having an axis which is generally perpendicular to the axis of the exit.
d. a second adapter module having defined therein a passageway adapted to receive a second heat-plastified thermoplastic polymer stream, said adapter module having a first end and a second end which are spaced apart and generally parallel and planar, the passageway having an entrance proximate to the first end of the module and an exit proximate to the second end of the module, the exit having an axis, the second adapter module being in operative contact with, and removably connected to, the assembled upper and lower conduit modules so that the second adapter module passageway and the arcurate passageway way are in fluid communication with each other and the axis of the second adapter module exit is coaxial with the axis of the entrance of the arcurate passageway;
e. a transition module having a first end and a second end, the module having defined therein a first passageway and a second passageway, each of which has a circular entrance and a generally rectangular exit, the entrances of said passageways being coplanar and the exits of said passageways being coplanar, the circular entrances each having an axis, said axes being parallel, the first end of the transition module is in operative contact with, and removably connected to, the second ends of the assembled upper and lower conduit modules so that the first passageway is in fluid communication with the arcurate passageway, the second passageway is in fluid communication with the lower conduit module passageway, the axis of the entrance of the first passageway is coaxial with the axis of the exit of the arcurate passageway way and the axis of the entrance of the second passageway is coaxial with the axis of the lower conduit module passageway;
f. a flow rate modifying module having a first end and a second end, the module having defined therein a first generally rectangular passageway adapted to receive the second heat-plastified stream from the generally rectangular exit of the first passageway of the transition module and a generally rectangular divided passageway adapted to receive the first heat-plastified stream from the generally rectangular exit of the second passageway of the transition module, each of said rectangular passageways beginning with an entrance proximate to the first end of the module and ending in a combined exit proximate to the second end of the module, the divided passageway being subdivided into at least two parallel passageways of generally equal cross section, the second end of the transition module and the first end of the flow rate modifying module being (1) in operative contact with, and removably connected to, each other and (2) aligned so that the first rectangular passageway is in fluid communication with the first passageway of the transition module and the rectangular divided passageway is in fluid communication with the second passageway of the transition module; and
g. a combining and transition module having a first end and a second end which are spaced apart and generally parallel and planar, said module having defined therein a passageway which has a generally rectangular entrance adapted to receive heat-plastified polymer from the combined exit of the flow rate modifying module and a circular exit, the first end of the combining and transition module being in operative contact with, and removably connected to, the second end of the flow rate modifying module and aligned so that the entrance is in fluid communication with the combined exit of the flow rate modifying module;
h. a plurality of external fastening means which hold the first adapter module, the combined upper and lower conduit modules, the transition module, the flow rate modifying module and the combining and transition module in position with respect to each other and apply an amount of compressive force upon the modules, the compressive force, in conjunction with a sealing surface diameter sufficiently large to minimize joint rotation between adjacent blocks and a seal relief area sufficient to minimize a counteracting force generated by leaking or migrating polymer, providing sufficient sealing stress to achieve a generally leak-free seal between adjacent modules.

2. The feedblock of claim 1 wherein the transition module comprises an insert holder and a replaceable insert, said insert being nonrotatably secured within the insert holder.

3. The feedblock of claim 1 wherein the insert has the general configuration of a right cylinder.

4. The feedblock of claim 1 wherein the flow rate modifying module comprises an insert holder and a replaceable insert, said insert being nonrotatably secured within the insert holder.

5. The feedblock of claim 3 wherein the insert has the general configuration of a right cylinder.

6. The feedblock of claim 1 wherein the lower conduit module is replaced by a central conduit module and a bottom conduit module, the central conduit module having a first end and a second end which are spaced apart and generally parallel and planar, a first side and a second side which are spaced apart and generally parallel and planar, and a top and a bottom which are spaced apart and generally parallel and planar, the module having defined therein a passageway adapted to receive the first heat-plastified stream and having an entrance proximate to the first end of the module, an exit proximate to the second end of the module and an axis, the top having defined therein an arcurate channel which has a first end beginning at the second side of the module and a second end ending at the second end of the module, the bottom having defined therein an arcurate channel which has a first end beginning at the first side of the module and a second end ending at the second end of the module, the first end of the module being in operative contact with, and removably connected to, the second end of the first adapter module and aligned so that (1) the axis of the central conduit module is coaxial with the axis of the exit of the first adapter module passageway and (2) the passageways are in fluid communication with each other; and the bottom conduit module having a first end and a second end which are spaced apart and generally parallel and planar, a first side and a second side which are spaced apart and generally parallel and planar, and a top and a bottom which are spaced apart and generally parallel and planar, the top having defined therein an arcurate channel which has a first end proximate to the first side of the module and a second end proximate to the second end of the module, the first end of the bottom conduit module being in operative contact with, and removably connected to, the second end of the first adapter module, the top of the bottom conduit module being in operative contact with, and removably connected to, the bottom of the central conduit module and aligned so as to form a second arcurate passageway having an exit formed by the second ends of the arcurate channels of the bottom and central conduit modules, the exit having an axis which is parallel to the axis of the central conduit module passageway, and an entrance formed by the first ends of the bottom and central conduit modules, the entrance having an axis which is generally perpendicular to the axis of the exit.

7. The feedblock of claim 6 wherein the second adapter module is in operative contact with, and removably connected to, the assembled upper and central conduit modules so that the second adapter module passageway and the first arcurate passageway are in fluid communication with each other and the axis of the second adapter module is coaxial with the axis of the entrance of the first arcurate passageway.

8. The feedblock of claim 6 further comprising a third adapter module having defined therein a passageway adapted to receive a third heat-plastified thermoplastic stream, said adapter module having a first end and a second end which are spaced apart and generally parallel and planar, the passageway having an entrance proximate to the first end of the module, an exit proximate to the second end of the module and an axis, the third adapter module being in operative contact with, and removably connected to, the assembled central and bottom conduit modules so that the third adapter module passageway and the second arcurate passageway are in fluid communication with each other and the axis of the third adapter module passageway is coaxial with the axis of the entrance of the second arcurate passageway.

9. The feedblock of claim 6 wherein the transition module is a modified transition module having a first end and a second end, the module having defined therein a first passageway, a second passageway and a third passageway, each of which has a circular entrance proximate to the first end of the module and a generally rectangular exit proximate to the second end of the module, each of the entrances having an axis parallel to the axes of the other entrances, the entrances being coplanar and the exits being coplanar, the first end of the modified transition module being in operative contact with, and removably connected to, the second ends of the assembled upper, central and bottom conduit modules so that the first passageway is in fluid communication with the first arcurate passageway, the second passageway is in fluid communication with the central conduit module passageway, the third passageway is in fluid communication with the second arcurate passageway, the axis of the entrance of the first passageway is coaxial with the axis of the exit of the first arcurate passageway, the axis of the entrance of the second passageway is coaxial with the axis of the central conduit module passageway and the axis of the entrance of the third passageway is coaxial with the axis of the exit of the second arcurate passageway.

10. The feedblock of claim 6 wherein the flow rate modifying module is a modified flow rate modifying module having a first end and a second end, the module having defined therein a first generally rectangular passageway adapted to receive the second heat-plastified stream from the generally rectangular exit of the first transition module passageway, a generally rectangular divided passageway adapted to receive the first heat plastified stream from the generally rectangular exit of the second transition module passageway and a second generally rectangular passageway adapted to receive the third heat plastified stream from the generally rectangular exit of the third transition module passageway, each of said rectangular passageways beginning with a separate entrance proximate to the first end of the module and ending in a combined exit proximate to the second end of the module, the divided passageway being subdivided into at least two parallel passageways of generally equal cross section, the second end of the modified transition module and the first end of the modified flow rate modifying module being (1) in operative contact with, and removably connected to, each other and (2) aligned so that the first rectangular passageway is in fluid communication with the first passageway of the transition module, the divided passageway is in fluid communication with the second passageway of the transition module and the second rectangular passageway is in fluid communication with the third passageway of the transition module.

* * * * *